Sept. 21, 1965   J. G. CHURCHILL ETAL   3,207,026
APPARATUS AND METHOD FOR DETERMINING THE INDIVIDUAL
AND AVERAGE CONTENT OF LIGHT ABSORBING FLUIDS
Filed Feb. 17, 1961   6 Sheets-Sheet 1
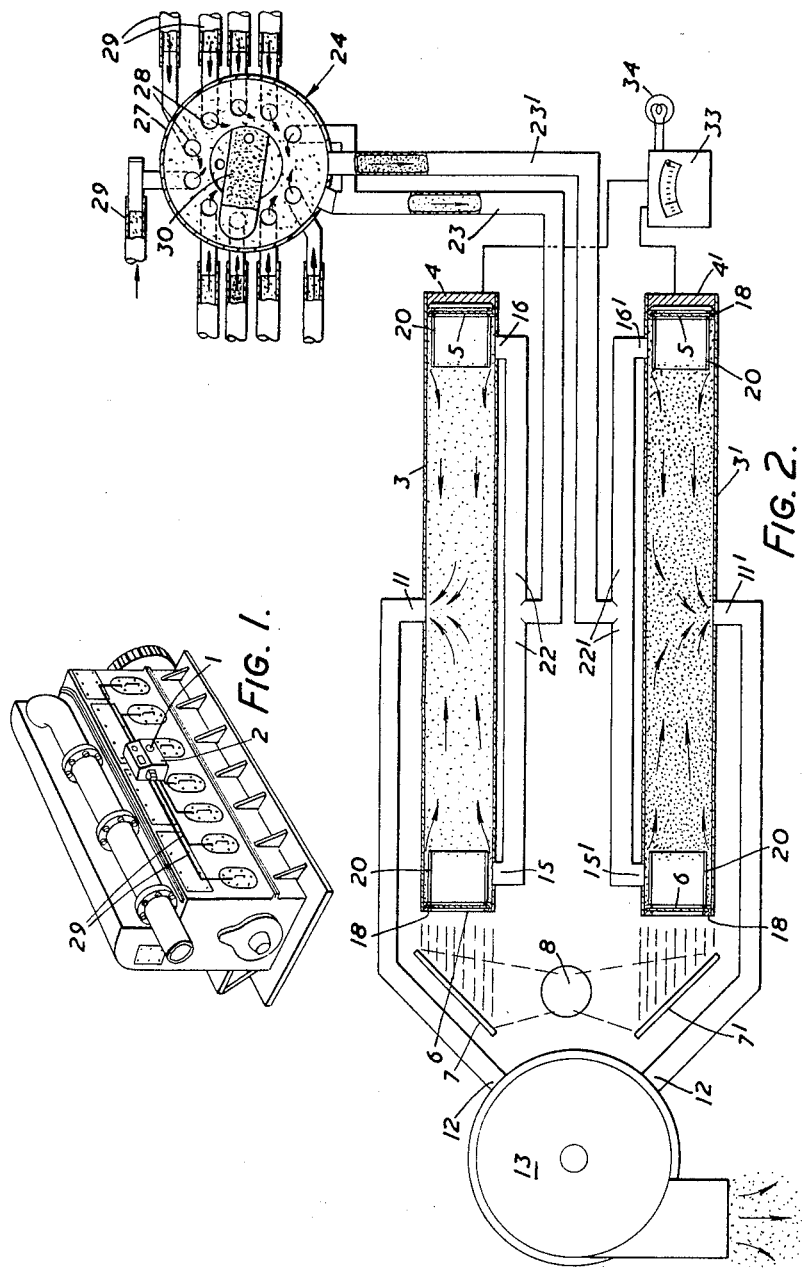
INVENTORS
JOHN GODWYN CHURCHILL
RICHARD HENRY LOVIE
BY
Mason, Mason & Albright
ATTORNEY

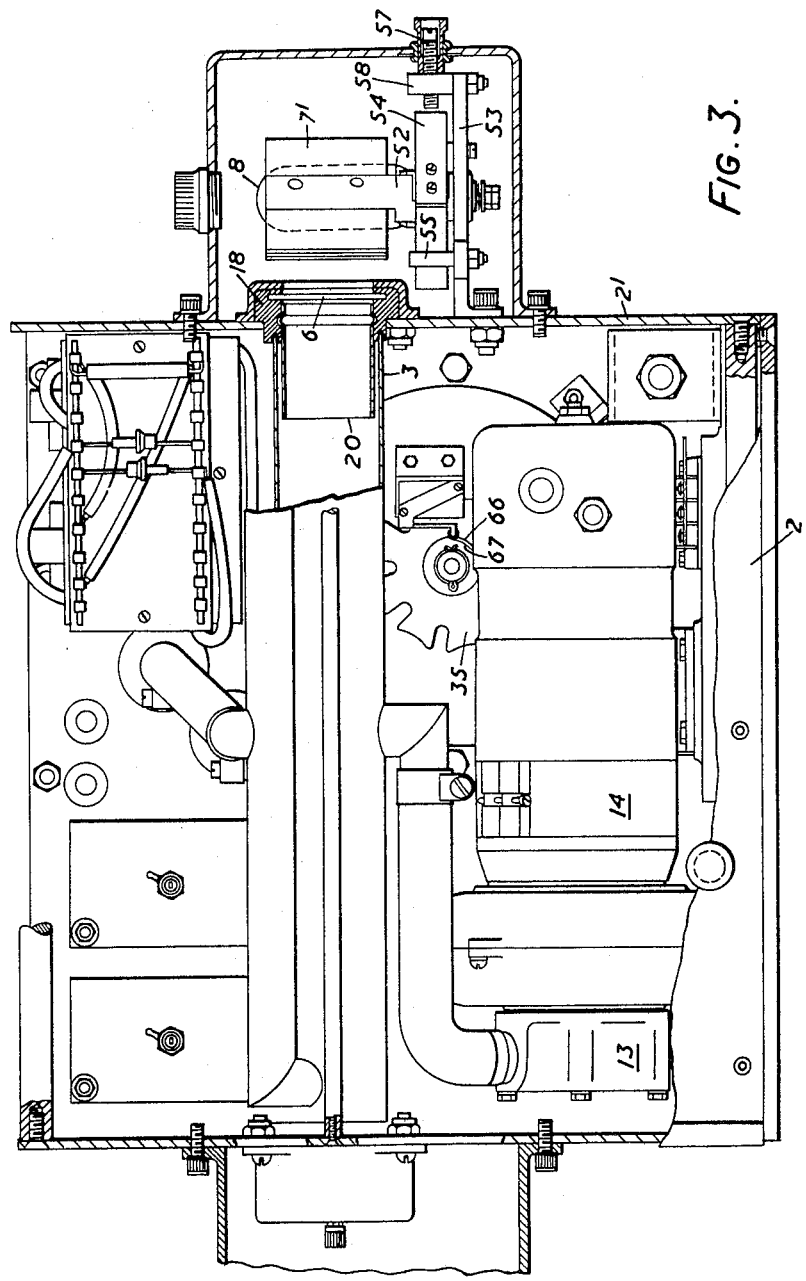

Sept. 21, 1965 J. G. CHURCHILL ETAL 3,207,026
APPARATUS AND METHOD FOR DETERMINING THE INDIVIDUAL
AND AVERAGE CONTENT OF LIGHT ABSORBING FLUIDS
Filed Feb. 17, 1961 6 Sheets-Sheet 3

INVENTORS
JOHN GOODWYN CHURCHILL
RICHARD HENRY LOVIE
BY
Mason, Mason & Albright
ATTORNEYS INVENTORS
JOHN GODWYN CHURCHILL
RICHARD HENRY LOVIE
BY
Mason, Mason & Albright
ATTORNEYS Sept. 21, 1965   J. G. CHURCHILL ETAL   3,207,026
APPARATUS AND METHOD FOR DETERMINING THE INDIVIDUAL
AND AVERAGE CONTENT OF LIGHT ABSORBING FLUIDS
Filed Feb. 17, 1961   6 Sheets-Sheet 5

INVENTORS
JOHN GODWYN CHURCHILL
RICHARD HENRY LOVIE
BY
Mason, Mason & Albright
ATTORNEY

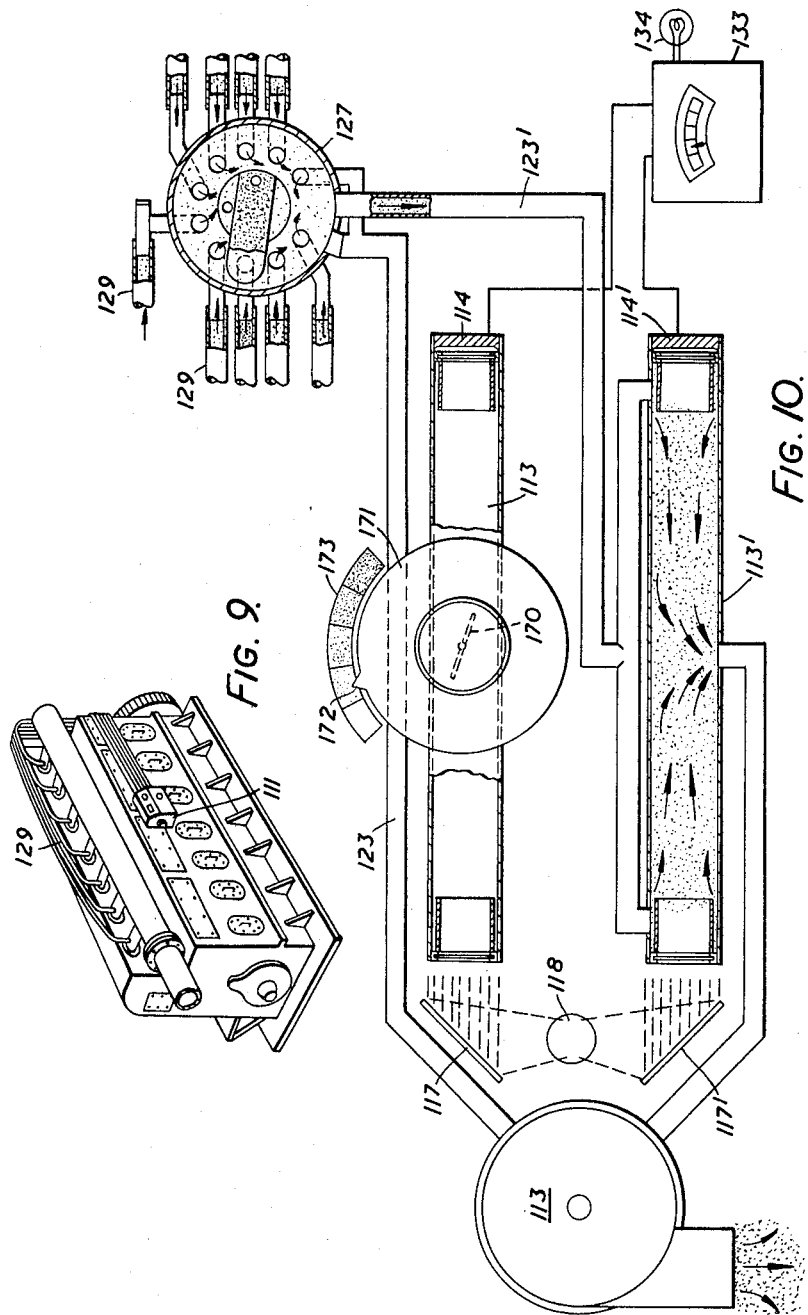

United States Patent Office 3,207,026
Patented Sept. 21, 1965

3,207,026
APPARATUS AND METHOD FOR DETERMINING THE INDIVIDUAL AND AVERAGE CONTENT OF LIGHT ABSORBING FLUIDS
John G. Churchill and Richard H. Lovie, Fareham, England, assignors to Graviner Manufacturing Company Limited, London, England, a British company
Filed Feb. 17, 1961, Ser. No. 90,027
10 Claims. (Cl. 88—14)

This invention relates to devices for detecting, or measuring the densities of, light-absorbing fluid such as a mist, in particular an oil mist, or smoke, coloured gas or the like.

The invention is particularly concerned with detectors designed for the detection of lubricating oil mists of excessive concentration occurring during the running of rotating plant and machinery and especially for the detection of such mists in the crankcases of internal combustion engines including diesel engines.

Excessive oil mist formation in crankcases may occur as a result of overheated bearings or piston skirts and the provision of means for detecting such excessive oil mist formation enables early remedial action to be taken to prevent further damage. Moreover, excessive oil mist formation may constitute an explosion hazard, and the provision of means for detecting such excessive formation enables action to be taken before the oil mist can reach an explosive concentration.

It is to be understood that the invention is also applicable to the detection of mists in general, for example the detection of vapour mists in air conditioning, refrigerating and gas cooling systems. Detection of colourless mists is possible, for example by passing the mist over an appropriate chemical which will react to colour the mist. The invention is also applicable to measuring the densities of exhaust gas from internal combustion engines.

One construction of detector in accordance with the present invention which will be described below, is designed to detect excessive oil mist formation in engine crankcases. Whilst described in connection with the detection of excessive oil mist formation, the detector can be used for other applications as referred to above.

It will be appreciated that during running of rotating plant, for example in the crankcase of an internal combustion engine, there is always a certain amount of oil mist present. The density of this mist will depend on a number of factors, for example the speed at which the engine is running, the load upon the engine and the temperature of the engine, the latter being in part dependent upon the two first mentioned factors and also upon the ambient temperature.

If a detector is required to give early warning of mist formation under all running conditions, difficulty is experienced because the amount of oil mist which may be present when the engine is running under full load, at high speed and in a high ambient temperature, would represent an excessive concentration under slow-speed low-load conditions. Detectors in accordance with one feature of the present invention are designed to overcome this difficulty by detecting the change in density of oil mist formation rather than the actual concentration at any given time although this also may be measured.

The accompanying drawings show, by way of example only, two constructions of devices according to the invention. In the drawings:

FIGURE 1 shows an oil mist detector installed on a diesel engine to sample gas drawn from a plurality of stations within the engine;

FIGURE 2 is a diagram illustrating the principle of operation of the oil mist detector;

FIGURE 3 is a cut-away side view of a practical embodiment of a detector utilising the principle illustrated in FIGURE 2;

FIGURE 9 is a diagrammatic view of a device for measuring the densities of exhaust gas in a diesel engine;

FIGURE 10 is a detail diagrammatic view of the device of FIG. 9; and

Figure 4:
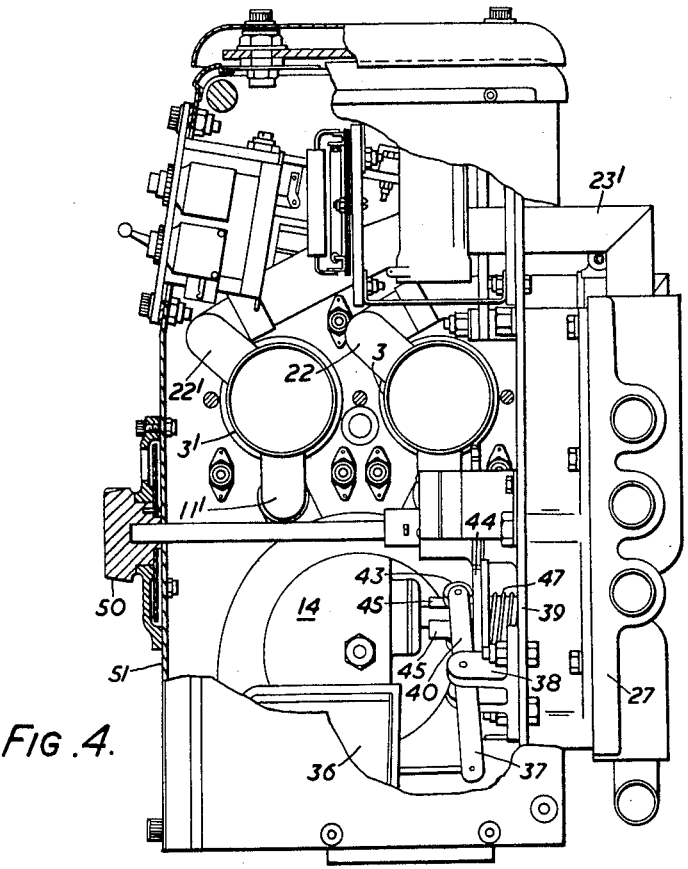
FIGURE 4 is a cut-away end view of the detector of FIGURE 3.

The detector 1 shown in FIGS. 1 to 7 comprises a housing 2 which includes a U-shaped chassis 2' supporting between its upright arms two tubes 3, 3' which each have a photoelectric cell 4,4 ' mounted behind a glass window 5 at one end of the tube. The other end of each tube is also closed by a glass window 6 and light is directed through each of these latter windows by mirrors 7, 7' which reflect light from a single electric lamp 8. Each tube is provided with an outlet port 11, 11' midway along its length which connects to the inlets 12 of a suction fan 13 driven by an electric motor 14. Each tube has two gas or vapour inlet ports 15, 16, 15', 16', one adjacent each end of the tube respectively.

At each end of each tube is a synthetic rubber or plastic moulding 18 and supported within this moulding is a cuff or sleeve 20 which extends for a short distance into the tube. The moulding is also provided with a groove for accommodating the end window.

The cuff extends past the inlet port at the adjacent end of the tube and in this way gas or vapour drawn into the tube due to the suction applied to the central outlet ports flows in an axial direction towards the centre of the tube and is directed away from the end window, thereby avoiding or reducing the deposit of dirt or other solid particles upon the window which might otherwise cause false warnings. The two inlet ports of the tube 3', which will hereafter be referred to as the sampling tube, are connected by branch pipes 22' to a common sampling inlet pipe 23' which is connected to a rotary valve 24. The two inlet ports of the other tube 3, which will hereafter be referred to as the averaging tube, are likewise connected by two branch pipes 22 to a common averaging inlet pipe 23 which is also connected to a different part of the rotary valve.

The rotary valve (FIGS. 2, 6 and 7) comprises a rotor 30 mounted within a casing 27, the latter having a number of gas ports 28 spaced apart around the axis of rotation of the rotor. The rotor is driven round in a stepping movement by a stepping member formed as a Geneva cross 35 to communicate in turn with the gas ports. The interior of the rotor is hollow but has three openings, namely a first opening 30a on its axis of rotation, a second opening 30b spaced from the axis to communicate in turn with the selected gas ports 28 and a third opening 30c diametrically opposed to the second opening and at a smaller distance from the axis, the first opening 30a of the rotor communicating permanently with the sampling tube 3'.

Figure 6:
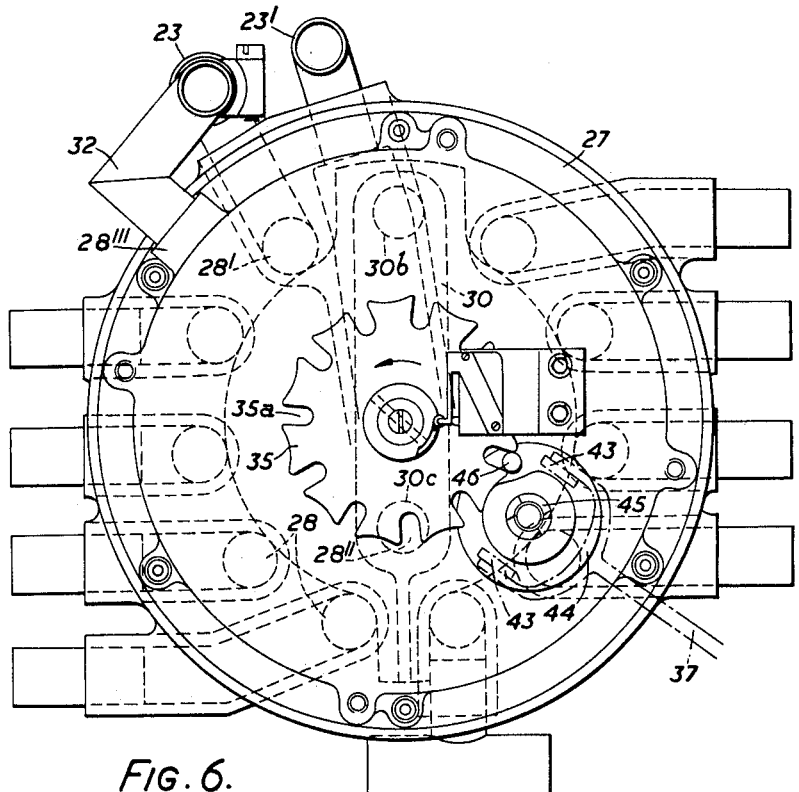
FIGURE 6 is a plan view of a sampling valve.
Figure 7:
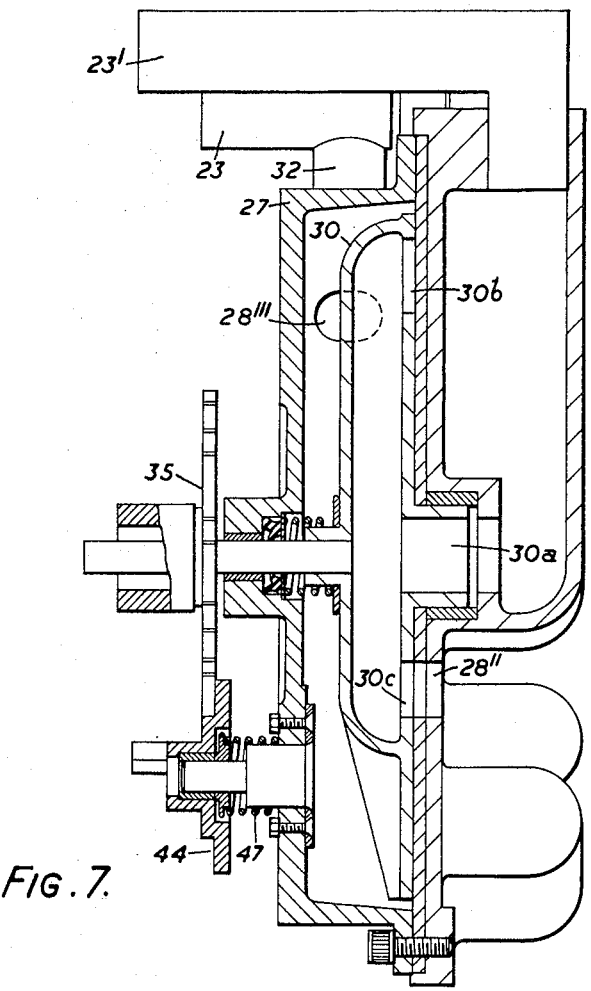
FIGURE 7 is a section through the valve of FIGURE 6.

In the particular valve under consideration, and shown in FIGS. 2 and 6, there are ten gas ports spaced apart around the valve casing in eleven positions, one position being blind, and the Geneva cross 35 has eleven recesses 35a so that the rotor is turned through one revolution in eleven steps, communicating with a different gas port at the end of each of ten steps. Over ten consecutive positions of the valve rotor, the rotor communicates in turn through its second opening 30b with each of ten gas ports 28. One of these gas ports 28', communicates directly with the averaging tube and the other nine with spaces in the engine or other apparatus to be monitored. At any particular time, all of these gas ports not communicating with the second opening of the rotor, open into the interior of the valve surrounding the rotor. When the rotor is in communication with any of the nine ports samplings gas from the engine, the third opening 30c in the rotor is covered so that samples of gas are led in turn from each of the nine ports via the second and first openings of the valve rotor to the sampling tube, and a mixed sample of gas passes from the remaining eight sampling ports via the ninth port 28' to the averaging tube. The valve rotor remains connected to one inlet port for a time sufficient to ensure that a sample of gas or vapour is drawn from the respective monitored space into the sampling tube. The valve rotor then moves on to the next inlet port and so on.

After samples have been selected in turn via the nine sampling ports, the valve rotor is stepped on into the blind position in which the second opening is covered and the third opening is placed in communication with a further port 28" open to the atmosphere so that clean air is drawn into the sampling tube to enable the average level of gas density for the nine monitored spaces to be measured. As an alternative to clean air, any suitable neutral i.e., non-light absorbing fluid may be used.

At the next step, the second opening of the valve rotor communicates with the port 28' leading to the averaging tube and, by means of a pipe coupling 32 connecting port 28' to the interior of the valve casing through a peripheral port 28''', is placed in communication with the space within the valve surrounding the rotor, so that an average sample of gas is led both to the averaging tube via the second opening and the sampling tub via the first opening. In this position the response for the two tubes should be equal, and accordingly this may be referred to as the "zero" position. The zero position is arranged to follow immediately after the "level" position, so that the air from the level position is cleared from the sampling tube by an average sample of gas before gas from an individual monitored space is drawn in.

The motor 14 driving the suction fan is also used to drive the Geneva cross for rotating the valve rotor. For this purpose a trip member in the form of a disc 44 is connected to the driving spindle of the motor by means of splines 45, the disc carrying a pin 46 for engaging in the recesses of the Geneva cross. To stop the drive to the valve rotor, the disc is moved axially against the force of a spring 47 to withdraw the pin 46 from the path of movement of the Geneva cross, or alternatively the motor is stopped. For the purpose of moving the disc 44, a solenoid 36 is provided which acts on one end of a lever arm 37 pivoted to a bracket 38 on a wall 39 of the detector chassis, the opposite end of the lever arm carrying rollers 43 which bear on the disc 44.

When the valve rotor is disengaged from the motor, the valve rotor can be turned manually by means of a control knob 50 on the front wall 51 of the detector housing and the valve can thus be set to any desired inlet port and in particular to the zero position so that the apparatus can be adjusted. This is effected by adjusting one mirror to control the amount of light reflected down one of the tubes to give equal light on both cells.

Figure 5:
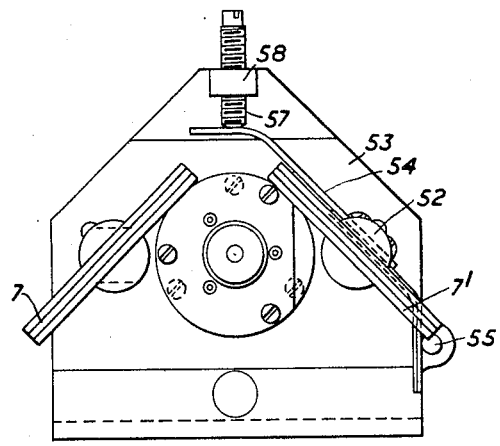
FIGURE 5 is a plan view of the light-reflecting arrangement seen in FIGURE 3.

For this purpose, as shown in FIGS. 3 and 5, the mirror 7' is mounted on a pin 52 upstanding from a fixed platform 53 and rotatable with respect to the platform. Extending through the pin 52 is a bow spring 54 which at one end engages a fixed abutment pin 55 on the plat-form and at the other end engages a screw 57 extending through a lug 58 mounted on the platform. Thus by moving the screw forwards or backwards, the adjacent end of the bow spring is moved laterally which in consequence rotates the mirror 7' through a small angle. By making the distance between the screw 57 and pin 52 sufficiently large, the angle of adjustment of the mirror will be very small for a relatively large translational movement of the screw.

Figure 8:
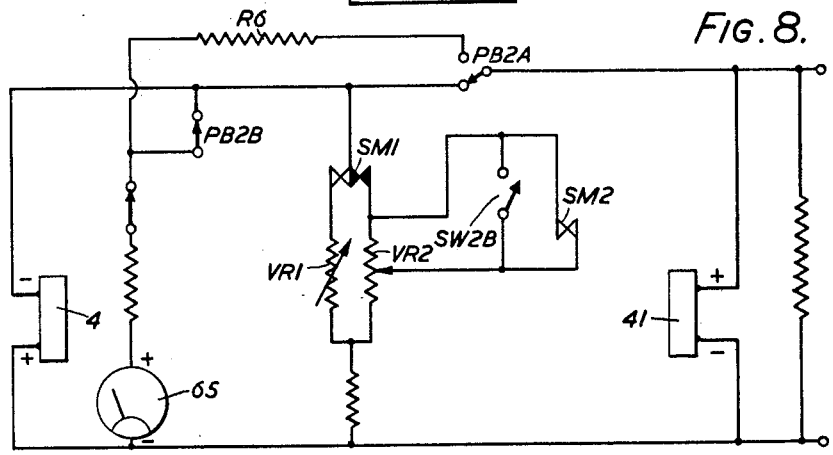
FIGURE 8 is part of an operating circuit for the detector.

As shown in FIG. 8, the two photoelectric cells 4', 4, of the sampling and averaging tubes respectively are electrically connected so that their outputs are in opposition and their opposed outputs are fed to a milli-ammeter 65 or other voltage measuring device or suitable electrical means which will give an indication when a predetermined out-of-balance voltage develops. In this construction a milli-ammeter is used of the kind in which the pointer carries a contact which at full scale deflection engages a fixed contact of a relay and is held thereon by magnetic means. The completion of these contacts is then arranged to operate a visual and/or audible alarm, both on the detector housing and at a position remote therefrom.

The desired sensitivity of the response from the photoelectric cells varies according to whether the gas sample compared with the average sample is a sample from a particular space within the engine to be monitored ("difference" sampling), a sample of fresh air ("level" sampling) or a like average sample ("zero" sampling). Accordingly, as shown in FIG. 8, two variable resistors $VR_1$, $VR_2$ are arranged to be connected in parallel with the milli-ammeter alternately by a first micro-switch SM1 to vary the sensitivity of the milli-ammeter and its associated relay, the "lower sensitivity" resistor $VR_2$ being selected only in the level and zero positions of the valve rotor.

Shunting the "lower sensitivity" resistor $VR_2$ are a second micro-switch SM2 and a further switch SW2B connected together in parallel. The two micro-switches are actuated by cams 66, 67 (FIG. 3) mounted for rotation with the valve rotor so that the first micro-switch connects the "higher sensitivity" resistor in circuit in the difference sampling positions, and the "lower sensitivity" resistor in circuit in the level and zero sampling positions.

If the valve rotor is halted in the zero position, the switch SW2B being closed by this operation, $VR_2$ is short circuited giving maximum sensitivity enabling the zero to be set accurately by adjustment of the mirrors. A sensitivity check is obtained by pressing push button PB2B ganged with PB2A to connect resistance $R_6$ and the micro-ammeter across the cell 4' so that a warning signal will be given if the sensitivity is normal.

In operation, the concentration of oil mist in the averaging tube is the average of that drawn from all the engine spaces being monitored with the exception of the space which at that time is connected by the rotary valve to the sampling tube. Likewise the concentration in the sampling tube corresponds to that of the space which is connected by the rotary valve to the sampling tube at that particular time. Should a fault develop at any part of the engine which results in increased generation of oil mist, when a sample is drawn from this part there will be greater obscuration of light in the sampling tube which will lead to an out-of-balance voltage developed by the photo-cell. If sufficient, this will cause full scale deflection of the milli-ammeter and operate the visual and/or audible alarms.

It will be understood that because any normal increase of oil mist formation occurring due to changes in the running conditions of the engine will occur relatively slowly, these will not result in a sufficient difference in the output of the two cells to cause a warning, and after a short time interval the concentration in the two tubes will become uniform.

Due to the variations in wear between the different cylinders and associated bearings, it may be that there is a difference between the normal acceptable oil mist concentration in the various parts of the crank case. To avoid this resulting in false warnings, whilst at the same time retaining a high degree of sensitivity in the detector, the pipes between the crank case and the rotary valve may be provided with adjustable air bleeds which enable the oil mist concentration fed into the rotary valve to be levelled off for the various parts of the crank case.

Each photoelectric cell may be a silicon cell, or vacuum cells with appropriate electronic amplification may be used.

It may be arranged that when the contacts of the detector complete the warning circuit they also operate the solenoid and stop the rotary valve in the warning position so that it can be quickly ascertained at what part of the engine the excessive oil mist formation is occurring.

The rotary valve may be modified to provide for continuous rotation of the valve rotor, rather than stepped rotation.

Figure 11:
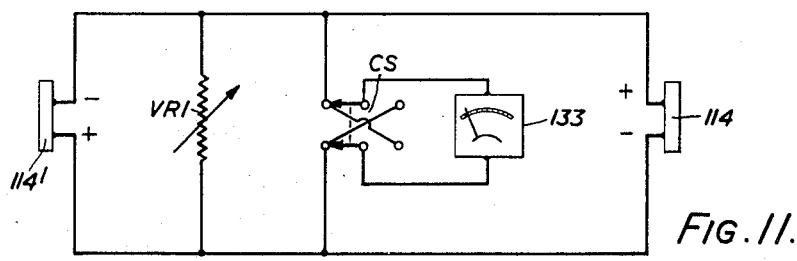
FIGURE 11 shows part of an operating circuit for the device of FIG. 9.

The modified form of the device for use in measuring the density of exhaust gas in a diesel engine is shown in FIGS. 9 to 11 of the drawings. As shown in FIG. 9, the device 111 is mounted on the diesel engine casing and is connected through pipes 129 to each cylinder exhaust stub pipe so that individual samples of exhaust gas from each cylinder can be drawn into the measuring device.

As shown in FIG. 10 the device comprises two tubes 113 and 113' as in FIG. 2, but in this case the tube 113 is filled with clean air and sealed closed. The other tube 113' is connected as in FIG. 2 by a pipe 123' to a rotary valve 127 to which samples of gas from the diesel engine cylinders are supplied through the pipes 129. The device is provided with a suction pump 113 which is connected with the sampling valve 127 via the tube 113', and also communicates directly with the interior of the valve 127 through a pipe 123. The tubes 113, 113' are provided at one end with photocells 114, 114' connected to a meter 133 and light from a light source 118 is directed by mirrors 117 and 117' along the tubes onto the photocells. It will be evident therefore that as individual samples of gas, or combined samples of gas, or a sample of air, are drawn through the tube 113', the meter will provide a reading of the density of the individual sample, the density of the combined sample or a zero reading respectively.

The tube 113 may however be further modified by the provision therein of a light obscuring filter in the form of a pivoted flap 170, such as a butterfly flap, which is rotatable from outside the tube by a disc 171 having a pointer 172 movable over a Ringlemann's smoke density scale 173. As this flap is rotated the amount of light passing along the tube will be varied and will provide the same effect as the presence of samples of smoke of varying density within the tube 113. The flap 170 may be positioned to give the effect of smoke of maximum allowable density so that when smoke is present in the tube 113' the meter will give a reading, and the meter may be used to operate a warning lamp or other warning device 134 if this reading exceeds a predetermined value corresponding to the maximum allowable smoke density.

By reason of the pipe 123 connecting the interior of the valve 127 to the suction pump 113, gas from each of the cylinders passes continuously through the valve and thereby a very quick warning is given if the gas in any one cylinder contains smoke of a density in excess of an allowable value.

As shown in FIG. 11, the two photocells are connected in opposition and the sensitivity of the meter is varied by a variable resistance VR1 connected in parallel therewith. The meter 133 is connected through a calibration switch CS across the photocells, and with the sample selector valve in the zero (air sampling) position and with the smoke density disc 171 set to the zero position on the scale, one of the mirrors 117, 117' can be adjusted so that a zero reading is provided on the meter 133. Then to set the sensitivity of the unit, the calibration switch is placed in the "calibrate" position, the smoke density pointer 172 is placed on the desired position of the scale and the variable resistance VR1 adjusted to give a full scale meter deflection. After setting, the calibration switch is returned to "normal" and the smoke density pointer returned to zero and the device will then give a meter reading with gas containing an appreciable density of smoke, or a warning if the sampled gas has a smoke density greater than that set on the smoke density scale.

To obtain a measurement of the density of the smoke emitted from any one cylinder or the average density of the smoke from all the cylinders, the valve is stopped in a position in which the tube 113' is connected to the particular cylinder or all the cylinders. The pivoted flap 170 is then turned until the reading on the meter 133 is reduced to zero indicating a balance between the responses of the two photocells 114, 114' and the value of smoke density can then be read directly from the Ringlemann scale.

Since the samples of gas will in this case be at a relatively high temperature, a heat exchanger or cooler is preferably connected between the engine and the tube 113' and preferably before the valve 127. This may take the form of an expansion chamber or chambers, or a heat exchanger employing coiled tubes with water cooling.

The form of oil mist detector and smoke density measuring device particularly described above are designed for selective sampling of a number of sources of gas. The device may however be modified and simplified for use in detecting or measuring oil-mist or smoke in gas from a single source. In such a modification, the sampling valve and valve driving mechanism is omitted. Furthermore the sampling tube 13' or 113' is permanently connected to the source of gas and the other tube is used as a comparator tube and for this purpose is sealed after evacuation or filling with clean air as in the case of the second embodiment. Again, if the source of gas is under pressure, the sampling tube is connected to the source through a pressure reducing valve, and in this case the fan for drawing air through the sampling tube will be omitted. The electrical circuit will also be correspondingly simplified.

We claim:

1. A device for determining the individual and average content of light absorbing fluid in a plurality of fluid samples, comprising means defining a pair of chambers, a photo-sensitive device in each said chamber, means for directing light through each of said chambers to fall on the said photo-sensitive device therein, and a valve having first flow-directing means acting over a plurality of single sample positions to direct into a first one of said chambers each of said plurality of fluid samples in turn, and second flow-directing means acting simultaneously to direct the remainder of said plurality of fluid samples into the second of said chambers, said first flow-directing means acting in a combined-sample position to direct a neutral fluid into one of said chambers and said second flow-directing means acting simultaneously to direct a combination of all said plurality of fluid samples into the other chamber, and means connected to said photo-sensitive devices for comparing the responses of said devices to determine, in said single-sample positions of the valve, the individual light-absorbing property of each sample in turn relative to the light-absorbing property of said remainder of the samples, and to determine in said combined-sample position of the valve, the average light-absorbing property of the samples.

2. A device for determining the individual and average content of light absorbing fluid in a plurality of fluid samples, comprising means defining a pair of chambers, a photo-sensitive device in each said chamber, means for directing light through each of said chambers to fall on the said photo-sensitive device therein, and a valve having first flow-directing means acting over a plurality of single sample positions to direct into a first one of said chambers each of said plurality of fluid samples in turn, and second flow-directing means acting simultaneously to direct the remainder of said plurality of fluid samples into the second of said chambers, said first flow-directing means acting in a combined-sample position to direct a neutral fluid into one of said chambers and said second flow-directing means acting simultaneously to direct a combination of all said plurality of fluid samples into the other chamber, both said flow-directing means cooperating in an apparatus-testing position to direct a combination of all said plurality of fluid samples into each said chamber, and means connected to said photo-sensitive devices for comparing the responses of said devices to determine, in said single-sample positions of the valve, the individual light-absorbing property of each sample in turn relative to the light-absorbing property of said remainder of the samples, to determine in said combined-sample position of the valve, the average light-absorbing property of the samples, and to determine, in said apparatus-testing position, the relative responses of said photosensitive devices to the equal light-absorbing property of the two combined samples.

3. A device for determining the individual and average content of light absorbing fluid in a plurality of fluid sample sources, comprising means defining a pair of chambers, a photo-sensitive device in each said chamber, means for directing light through each chamber onto the said photosensitive device therein, a valve, a first duct connecting said valve to a first one of said chambers, a second duct connecting said valve to the second of said chambers, means in said valve defining a fluid passage and movable to a plurality of single-sample positions sequentially in which it connects said first duct with each of said fluid sample sources in turn and simultaneously causes the second duct to communicate with the remainder of said plurality of fluid sample sources to supply a sample of fluid from one individual source to said first chamber simultaneously with the supply of a combined sample of fluid from the remaining sources to the second chamber, said movable means being movable on occasion into a combined-sample position in which it connects one of said chambers with a source of neutral fluid and simultaneously connects all of said plurality of fluid sample sources with the other of said chambers, said movable means being further movable on occasion into an apparatus-testing position in which it connects each of said chambers with all of said plurality of fluid sample sources, and means connected to said photo-sensitive devices for comparing the responses of said devices to compare, in said single-sample positions of the valve, the light-absorbing property of each individual sample in turn with the light-absorbing property of said remainder of the samples, and to determine in said combined-sample position of the valve, the average light-absorbing property of the samples, and in said apparatus-testing position to check the ratio of the outputs from the photo-sensitive devices.

4. A device according to claim 3 wherein said valve comprises a casing containing a plurality of ports, disposed in a ring, for admitting the individual samples of fluid to said chambers, said movable means comprising a rotor defining said fluid passage and movable in said casing into coincidence with each of said ports to select samples of fluid to be supplied to said first chamber, the remainder of the sampling ports communicating with the interior of the casing, said second chamber communicating with the interior of said casing through said second duct, said casing having an additional port open to a source of neutral fluid, said rotor communicating with said neutral fluid port in a position of the rotor in which all the sampling ports communicate with the interior of the casing, the neutral fluid port being closed by said rotor in the other positions of the rotor.

5. A device for determining the individual and average content of light absorbing fluid in a plurality of fluid samples from separate sources of fluid, comprising means defining a pair of chambers, a photo-sensitive device in each said chamber, means for directing light through each of said chambers to fall on the photo-sensitive device therein, a valve having a casing provided with plurality of inlet ports connected to the respective sources of fluid, a first outlet port, a first duct connecting said first outlet port with a first one of said chambers, a second outlet port, a second duct connecting said second outlet port with the second of said chambers, a hollow rotor in said casing in permanent communication with said first outlet port and movable into a plurality of individual-sample positions in each of which it registers with a different one of said inlet ports in turn to direct individual fluid samples into said first chamber, the second outlet port communicating via the interior of the casing with the remainder of said sample inlet ports to direct, in each individual-sample position of the rotor, the remainder of said plurality of fluid samples into said second chamber, said valve having an additional inlet port open to a source of neutral fluid, said valve rotor being movable once in each revolution thereof into a combined-sample position in which it registers with said neutral fluid port to direct neutral fluid into said first chamber and thereby permit a combined sample of all the plurality of fluid samples to be introduced into said second chamber, and means connected to said photo-sensitive devices for comparing the responses of said devices to determine, in said single-sample positions of the valve, the individual light-absorbing property of each sample in turn relative to the light-absorbing property of said remainder of the samples, and to determine in said combined-sample position of the valve, the average light-absorbing property of the samples.

6. A device according to claim 5 having a continuously rotatable motor and means coupling said motor to said valve rotor to move it in steps between said inlet ports.

7. A device according to claim 6 wherein said coupling means comprise a stepping member, means coupling said stepping member to drive the valve rotor, said member having recesses in its periphery corresponding in number to the number of steps through which the valve rotor is moved in each revolution thereof, and a trip member, means connecting said trip member to said motor for continuous rotation thereby, a projection on said trip member arranged to engage in one of said recesses at each revolution of the trip member to rotate the stepping member and hence the valve rotor onward through one step.

8. A device according to claim 7 wherein said trip member has a flat surface normal to its rotational axis, means for moving said trip member along said axis, said means comprising an arm, one end of which bears against said surface, and means supporting said arm of pivotal movement.

9. A device responsive to the density of light absorbing fluid in any one of a plurality of fluid samples, comprising means defining a pair of chambers, a photo-sensitive device in each said chamber, means for directing light through said chambers to fall on the respective said photo-sensitive device, a variable light-obscuring filter positioned in a first one of said chambers, a valve, a casing in said valve having an inlet port for each of said plurality of samples, and an outlet port, a duct connecting said outlet port to the second of said chambers, means in said valve defining a fluid passage and movable into a plurality of single-sample positions in which it connects each of said inlet ports in turn with said outlet port, said movable means being movable into a further, combined-sample, position in which it connects all of said inlet ports simultaneously with said outlet port, and means connected to said photo-sensitive devices for comparing the responses of said devices to compare, in said single-sample positions of the valve, the light-absorbing property of each sample in turn with the light-obscuring power of said filter and to compare in said combined-sample position of the valve, the average light-absorbing property of the samples with the light-obscuring power of the filter.

10. The method of determining the individual and average content of light absorbing fluid in a plurality of samples of fluid comprising the steps of establishing two spaces for receiving fluid, conducting each of said samples of fluid in turn through a first one of said spaces, conducting simultaneously the remainder of said samples through the other of said spaces, passing light through each of said spaces, and comparing the amount of light which is absorbed in said first space in respect of each sample therein with the corresponding amount of light which is absorbed in said other space by said remainder of said samples therein to determine each side individual content in relation to that of the remainder, occasionally passing a sample of clean air through said first space intermediate two of said fluid samples and simultaneously conducting a combined sample of all the fluid samples through said other space and comparing the relative amounts of light absorbed in said spaces to determine said average content.

References Cited by the Examiner

UNITED STATES PATENTS

| | | | |
|---|---|---|---|
| 1,422,178 | 7/22 | Cooley | 137—625.23 |
| 2,510,977 | 6/50 | Hoblemann. | |
| 2,524,303 | 10/50 | Bonet-Maury | 250—218 X |
| 2,854,585 | 9/58 | Simmons | 250—220 |
| 2,899,858 | 8/59 | Stott | 88—14 |
| 2,976,761 | 3/61 | Whitehead et al. | 88—14 |
| 2,991,804 | 7/61 | Merkle | 137—625.23 |

JEWELL H. PEDERSEN, *Primary Examiner.*

WILLIAM MISIEK, *Examiner.*